US011187718B2

(12) United States Patent  
Clark et al.

(10) Patent No.: US 11,187,718 B2  
(45) Date of Patent: Nov. 30, 2021

(54) SHOCK GAUGE SYSTEM

(71) Applicant: U.S. GOVERNMENT AS REPRESENTED BY THE SECRETARY OF THE ARMY, Washington, DC (US)

(72) Inventors: David W. Clark, Troy, MI (US); Thomas R. Dupont, Harrison Township, MI (US); Craig D. Foster, Plymouth, MI (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 168 days.

(21) Appl. No.: 16/575,134

(22) Filed: Sep. 18, 2019

(65) Prior Publication Data

US 2021/0080483 A1 Mar. 18, 2021

(51) Int. Cl.
*G01P 15/12* (2006.01)
*G01N 3/30* (2006.01)
*G01N 3/313* (2006.01)
*G01N 3/303* (2006.01)
G03B 39/06 (2021.01)

(52) U.S. Cl.
CPC .............. *G01P 15/121* (2013.01); *G01N 3/30* (2013.01); *G01N 3/303* (2013.01); *G01N 3/313* (2013.01); G03B 39/06 (2013.01)

(58) Field of Classification Search
CPC .......... G01N 3/303; G01N 3/313; G01N 3/30; G01P 15/121
See application file for complete search history.

(56) References Cited

U.S. PATENT DOCUMENTS

| 2,454,793 | A | 10/1948 | Crede et al. |
| 2,455,356 | A | 12/1948 | Crede |
| 3,021,813 | A | 2/1962 | Rips |
| 4,387,587 | A | 6/1983 | Faulconer |
| 6,609,409 | B1 * | 8/2003 | Bock ........................ G01M 7/08 73/12.01 |
| 6,807,841 | B1 | 10/2004 | Chen et al. |
| 6,990,845 | B2 * | 1/2006 | Voon ........................ G01N 3/48 73/12.14 |
| 9,377,386 | B2 * | 6/2016 | Ruth ........................ G01N 3/30 |
| 2006/0043712 | A1 * | 3/2006 | Hakki .................... B60R 19/205 280/735 |

(Continued)

*Primary Examiner* — Helen C Kwok
(74) *Attorney, Agent, or Firm* — Laura K. Lutz; Gregory P. Gibson; Daniel E. Hegner

(57) ABSTRACT

One example is a shock gauge system for measuring an external blast to a hull. The shock gauge system includes at least one accelerometer to produce acceleration data in response to the external blast, a mass with an accelerometer affixed to it, a crush block, a linear displacement potentiometer (LDP), a camera, and a processor logic. The LDP device generates displacement data of a mass being pushed into the crush block when reacting to the external blast. The camera captures images of movement of the mass. The processor logic verifies if the acceleration data is valid by correlating the acceleration data to the displacement data, the images, and/or an amount of displacement into the crush block by the mass. When the acceleration data is valid, the acceleration data may be used to create a more blast resistant hull.

20 Claims, 7 Drawing Sheets

(56) References Cited

U.S. PATENT DOCUMENTS

| | | | | |
|---|---|---|---|---|
| 2007/0125152 A1* | 6/2007 | Brankov | ................ | G01N 3/303 |
| | | | | 73/12.01 |
| 2009/0019917 A1* | 1/2009 | Lim | ...................... | G01N 3/303 |
| | | | | 73/12.06 |
| 2009/0090166 A1* | 4/2009 | Talley | .................... | G01N 3/303 |
| | | | | 73/12.06 |
| 2009/0131185 A1* | 5/2009 | Speedie | .................... | A47D 9/02 |
| | | | | 472/119 |
| 2010/0192667 A1* | 8/2010 | Friedman | .......... | G01M 17/0074 |
| | | | | 73/12.06 |
| 2012/0047989 A1* | 3/2012 | Bottlinger, Jr. | ........ | G01N 3/313 |
| | | | | 73/12.08 |
| 2012/0186369 A1* | 7/2012 | Matlschweiger | . | G01M 17/0078 |
| | | | | 73/865.3 |
| 2013/0311126 A1* | 11/2013 | Scott | ................ | G01M 17/0078 |
| | | | | 702/113 |
| 2019/0381963 A1* | 12/2019 | Verschut | ............... | A61B 5/1114 |

* cited by examiner

SHOCK GAUGE SYSTEM

GOVERNMENT INTEREST

The inventions described herein may be made, used, or licensed by or for the U.S. Government for U.S. Government purposes. The U.S. Government has rights in the invention(s).

TECHNICAL FIELD

A shock gauge is a device used to measure the impact an explosion may have on an object. An improved shock gauge may use accelerometers and other devices to measure the acceleration and other parameters of a device in response to an explosion. In particular, a shock gauge may generally combine data from one or more accelerometers and other devices to determine the effects an explosion or other force has upon a hull of a vehicle.

BACKGROUND

A shock gauge is a device that may be used to measure a response of a vehicle hull to an explosion beneath the vehicle hull. However, measuring data associated with the response of a vehicle hull to an explosion is very difficult to perform accurately because of the extreme speed most explosions occur. The associated high energy, transient acceleration and velocity structural responses amplify the difficulty in measuring data associated with the response of a vehicle hull to an explosion. What is needed is a better shock gauge.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One example is a shock gauge system for measuring an external blast to a hull. The shock gauge system includes at least one accelerometer to produce acceleration data in response to the external blast, a crush block, a linear displacement potentiometer (LDP), a camera, and a processor logic. The LDP device generates displacement data of a mass being pushed into the crush block when reacting to the external blast. The camera captures images of movement of the mass. The processor logic verifies if the acceleration data is valid by correlating the acceleration data to the displacement data, the images, and/or an amount of displacement into the crush block by the mass. When the acceleration data is correlated as valid, the acceleration data may be used to create a more blast resistant hull.

Another example is a shock gauge system to test a reaction of a vehicle hull to an external blast. The shock gauge system includes a high speed camera, a shock gauge device, a crush block and at least one accelerometer. The high speed camera captures images during the external blast. The shock gauge device includes a housing with an opening, a linear displacement potentiometer (LDP) device with an LDP cylinder and an LDP rod at least partially slidably located within the LDP cylinder, and a mass. The mass is attached to a lower end of the LDP rod. The LDP device captures linear displacement data of the mass. The crush block has known crush characteristics. The mass is pushed into the crush block during the test and the camera captures images of a movement of the mass with respect to the crush block during the test. The LDP device generates displacement/acceleration data during the test. The acceleration data, the linear displacement data, and/or images capture by the camera are correlated with the acceleration data to determine if the acceleration data is valid. When the acceleration data is valid, the acceleration data may be used to develop a vehicle hull to better withstand the external blast.

Another example embodiment is a method of analyzing an external blast to a hull. The method begins by measuring acceleration to capture acceleration data. The linear displacement of a mass is calculated to capture linear displacement data. The method next captures images to create captured images of the displacement of the mass. The acceleration data is correlated to the linear displacement data and the captured images to determine if the acceleration data is valid data. The acceleration data is used to create an improved hull when the acceleration data is valid.

The following description and the annexed drawings set forth in detail certain illustrative aspects of the subject matter. However, these aspects are indicative of some of the numerous ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
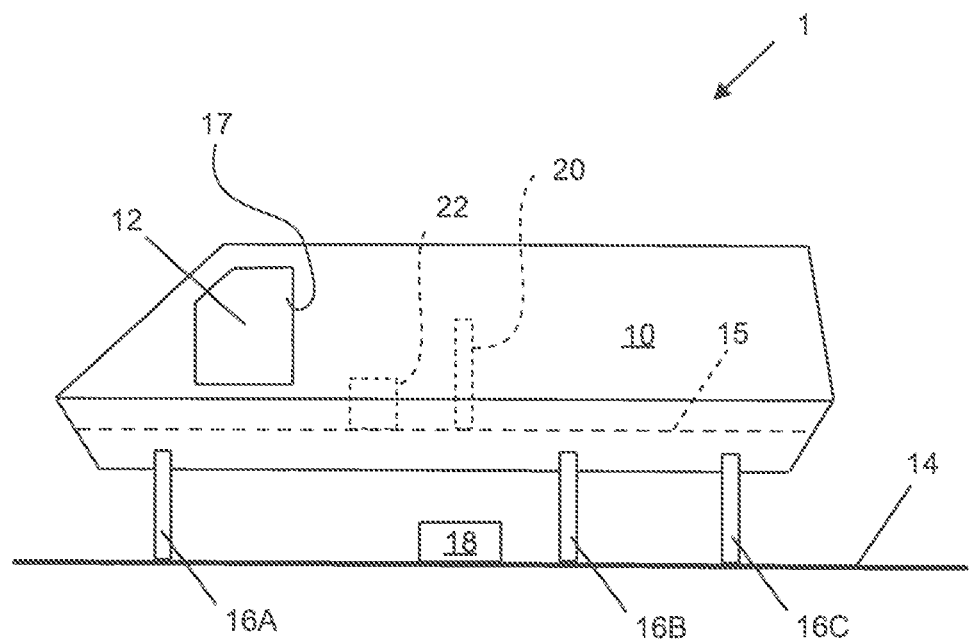
FIG. 1 illustrates a system/test environment that may be used to test a hull of a vehicle in response to an underbody blast event.

FIG. 1 illustrates an example system/test environment 1 that may be used to test a hull 10 of a vehicle in response to an underbody blast event. In general, an underbody blast event is typically caused by an Improved Explosive Device (IED) or land mine. The shock wave and force of the soil impacting a vehicle frequently deforms the vehicle and propels the vehicle upward. Occupants of the vehicle are frequently injured during the initial loading and also when the vehicle falls to the ground. As illustrated in FIG. 1, an explosive device 18 may be resting upon the ground 14 or at least partially buried beneath the ground 14. The hull 10 may be a test hull resembling or formed from at least a portion of a vehicle. In some embodiments, the vehicle may be a tracked and/or wheeled vehicle or another type of vehicle where it is desired to understand the vehicle's response to the explosion from an explosive device 18. For example, the vehicle may be a ground combat vehicle ,an army tank, a personnel carrier, a high mobility multipurpose wheeled vehicle, a lighter weight combatvehicle, a combat support vehicle, a mine-protected vehicle, a utility vehicle, or any other vehicle.

The vehicle hull 10 may rest upon one or more supports 16A-C placed approximate where load bearing wheel or track structures may be located to elevate the vehicle hull 10 above the ground 14 to simulate how a vehicle travels over ground. The vehicle hull 18 may include a door 12 providing access into an interior chamber 17 of the vehicle hull 10. The interior chamber 17 may include a floor 15. A shock gauge 20 and a camera system 22 are located on the floor 15 and the shock gauge 20 may be located above the explosive device 18.

Figure 2:
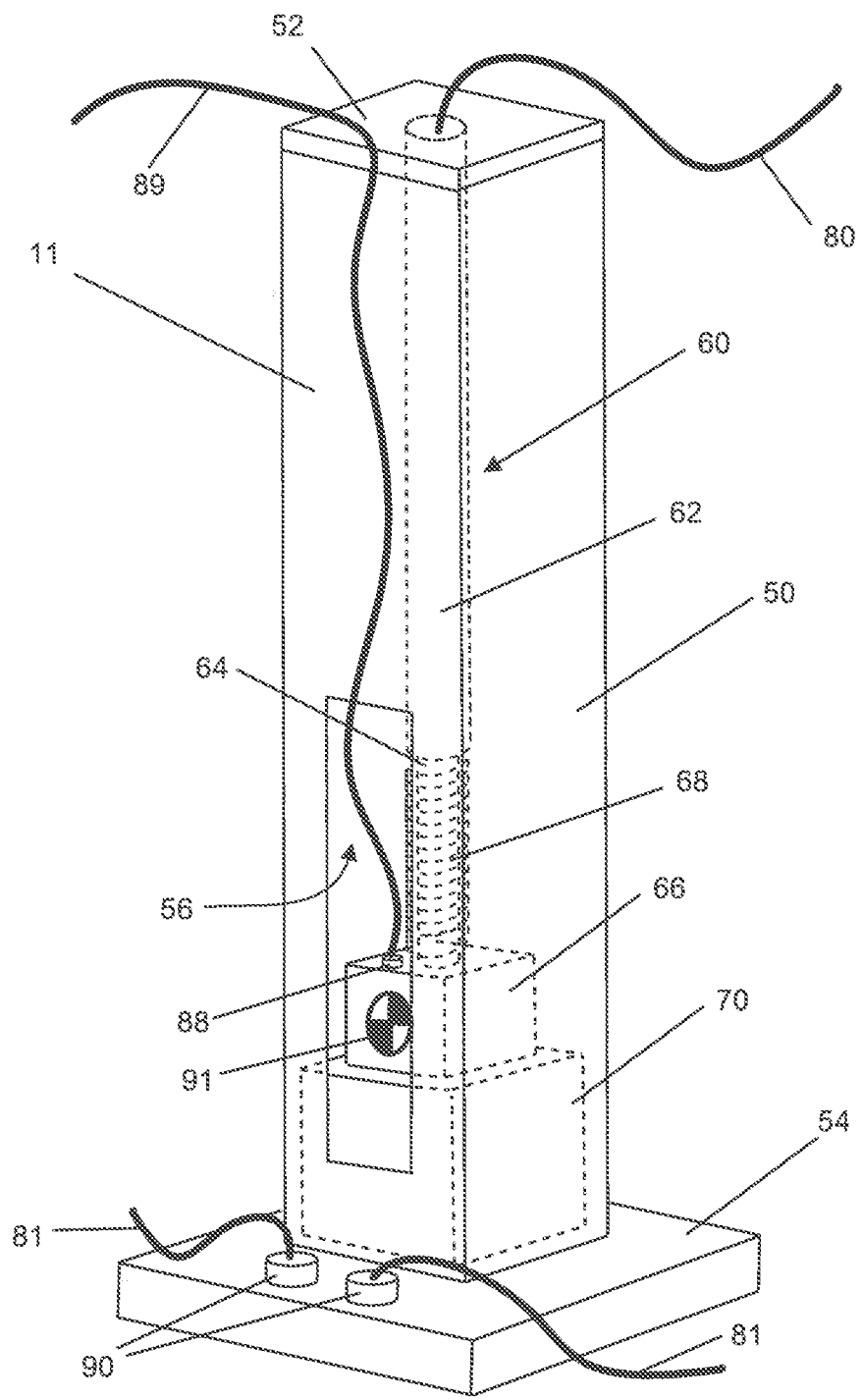
FIG. 2 illustrates one example of the internal components of the shock gauge.

Before the details of an example shock gauge 11 illustrated in FIG. 2 are discussed, the general theory of measuring data effecting vehicle hulls from explosions is discussed. Traditionally, because explosions happen rapidly, acceleration data recorded during underbody blast testing of a hull can demonstrate significantly high variation and inconsistencies potentially leading to an erroneous analysis. Such a situation could result in inappropriate application of technology countermeasures to protect Warfighters in military ground vehicles. During underbody blast events, a tremendous amount of energy is released from the underbody threat charge. The vehicle structure experiences transient, high impulse energy resulting in sudden acceleration and velocity change in the vehicle structure. Forces resulting from the sudden acceleration and velocity changes in the vehicle structure can cause death and serious injury to Warfighters who are occupants in the military vehicles. Thus, to design vehicles to withstand these blasts, verifiable and reliable acceleration and velocity test measurement data is needed from vehicle structures during an underbody blast event. This will help to ensure technology countermeasures are appropriately integrated into the vehicle to mitigate the occupant injury risks resulting from the blast event.

In the past, field blast test procedural practice primarily used electronic accelerometers to capture structural responses from underbody blast tests. Accelerometers are generally devices that measures their own acceleration, which is the rate of change in velocity. Actual blast test data have indicated significant variations can occur in underbody blast output test data generated from test accelerometers that are even adjacent each other. These variations are caused by a number of factors including the type of accelerometer used, type of accelerometer mount used, unique local responses of a structure unrepresentative of adjacent structure, soil type (e.g., density, moisture content), parsing data representing local strain, global structural strain, and global structural motion among other factors. In addition, underbody field test blast data measurements from accelerometers and drop tower accelerative data taken from laboratory experiments have not been successfully correlated due to the aforementioned factors as well as dynamic differences between vertical accelerative drop testing methods and field blast testing.

Additionally high impact blast loading of combat vehicle hulls tends to confuse accelerometers and/or associated filters due to the high-frequency ringing of the hull, etc. Sometimes the accelerometer is unable to accept the high-impulse input. Other times, the filter is not appropriate for the hull harmonics and can corrupt otherwise accurate acceleration data. In either case, it is not clear if the acceleration data, filtered or unfiltered, is accurate.

Figure 3:
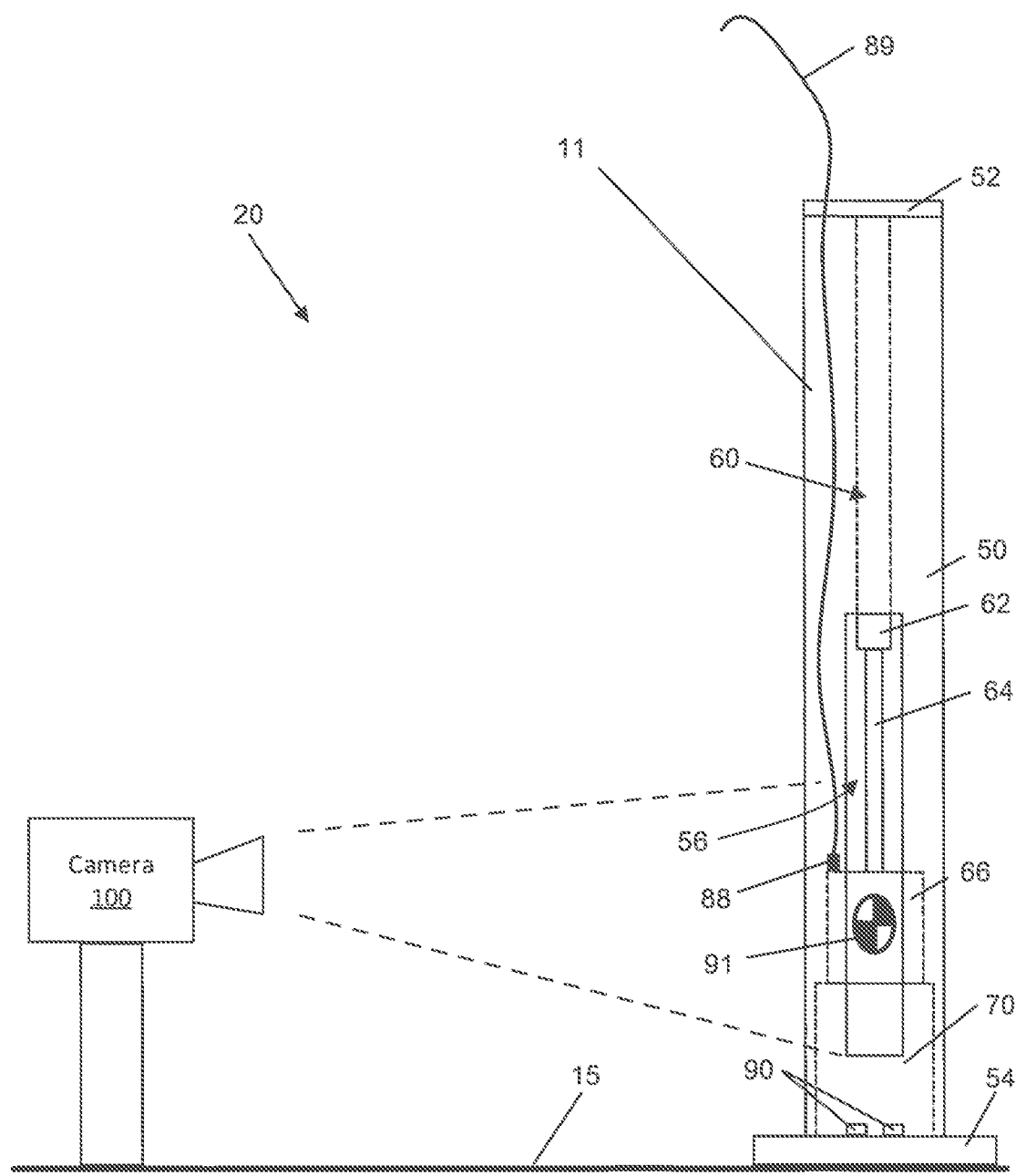
FIG. 3 illustrates an example shock gauge system to test a reaction of a vehicle hull to an external blast.

The improved shock gauge 11 of FIG. 2 and the shock gauge system 20 of FIG. 3 improve measuring data on vehicle hulls associate with high impact blasts. The shock gauge system 20 of FIG. 3 is fully-integrated with electro-mechanical and visual measurements redundancies. The redundancy features record independent measurements (visual displacement measurements, and shock gauge crush data) in concert with traditional acceleration data to provide a means to verify accelerometer and velocity data. In addition, video capture of the actuation of the shock gauge internal components provides an additional means to verify accelerometer and velocity data using high speed video data analysis to verify accelerations and velocities experienced by the shock gauge 11 during the vertical accelerative event.

To summarize, the improved shock gauge system 20 of FIG. 3 provides for independent data measurements that can be used to correlate, cross-reference and verify acceleration data. The shock gauge system 20 combines three independent measurements that are indications of acceleration. These include, first, visually examining a tracking window in the shock gauge 11 to view movement of a mass. This can be accomplished taking high speed time stamped images and comparing the images. Secondly, a linear displacement potentiometer (LDP) is used to determine the displacement. An LDP is a device used to measure a body's displacement. Third, electronic accelerometer sensors are used to measure acceleration. There are no prior known shock gauge measurements devices that combine these three measurements of acceleration to verify the electronic accelerometer sensors have correctly measured acceleration data.

Returning to the shock gauge 11 of FIG. 2, the shock gauge is formed with a main housing 50 that may have four rigid side walls with a chamber formed by the side walls to house internal components of the shock gauge 11. A top wall 52 may cover an upper portion of the side walls of the housing 50 and the housing 50 may be bolted to a base plate 54 with bolts and brackets or attached to the base plate 54 in other ways such as by welding. An opening 56 may be formed into at least one wall of the housing 50 to allow a camera 100 (FIG. 3) to capture images of internal components of the shock gauge 11 when a test is performed. One or more electronic accelerometers 90 may be attached to the base plate 54 and/or on other portions of the shock gauge 11 as desired.

"Rigid material" is defined herein as any material that retains its shape when formed and that is not a liquid or a gas. Rigid material may be pre-formed into specific shapes such as C-channel, box-channel, as well as square and/or rectangular tubing. For example, rigid materials include metal steel, aluminum, plastics, wood, etc.

"Rigidly connected" or "rigidly mounted" is defined herein to mean that two or more materials are connected together by welding, bolts, glue, clamps and/or connected together in another way as understood by a person with ordinary skill in the art so that the connected components essentially do not move relative to each other.

FIG. 2 illustrates one example of the internal components of the shock gauge 11. The shock gauge 11 includes an LDP device 60. In some embodiments, the LDP device 60 may be similar to the linear displacement sensors produced by Penny & Giles, a Curtiss Wright Company. The LDP device 60 is formed, in part, with an LDP cylinder 62 and an LDP rod 64. Linear displacement measurement circuitry (not shown) is located within the LDP cylinder 62. A mass-mounted accelerometer 88 is attached to the top of the mass 66. The mass 66 is attached to a lower end of the LDP rod 64. In some embodiments a crush block 70 with known crush characteristics is positioned below the mass 66. Typical crush blocks may be honeycombed (with a hexagonal pattern) in shape through their cross-section. In some embodiments, the mass 66 may be a sold block of metal or another sufficiently strong and heavy material. The LDP rod 64 slides at least partially within the LDP cylinder 62. An upper end of the LDP cylinder 62 is attached to an underside of the top wall 52. In some embodiments, the LDP cylinder 62 is preferably pivotally attached to the top wall 52 will with at least one axis of rotation. In some embodiments, a rebound control spring 68 is located between a lower end of the LDP cylinder 62 and the mass 66 to provide some rebound stability/control during testing so that the mass 66 does not inadvertently damage the LDP cylinder 62 during rebound. Wire 80 outputs carry data representing linear displacement data from the LDP device 60 and wires 81 carry output acceleration data representing acceleration from the electronic accelerometers 90. Mass-mounted accelerometer wires 89 carry output acceleration data from the mass-mounted accelerometer 88. In some embodiments, the linear displacement data and/or the acceleration data may be represented as a voltage and in other embodiments it may be digital data.

FIG. 3 illustrates the shock gauge system 20. The shock gauge system 20 includes the shock gauge 11 and a camera 100 both mounted to the floor 16 of a vehicle hull to be tested. The camera 100 is a high speed camera that takes time stamped images and is focused on the opening 56 in the housing 50 so that a mass-mounted visual target (e.g., sticker 91) on the side of the mass 66 may be imaged using high speed video.

Figure 4:
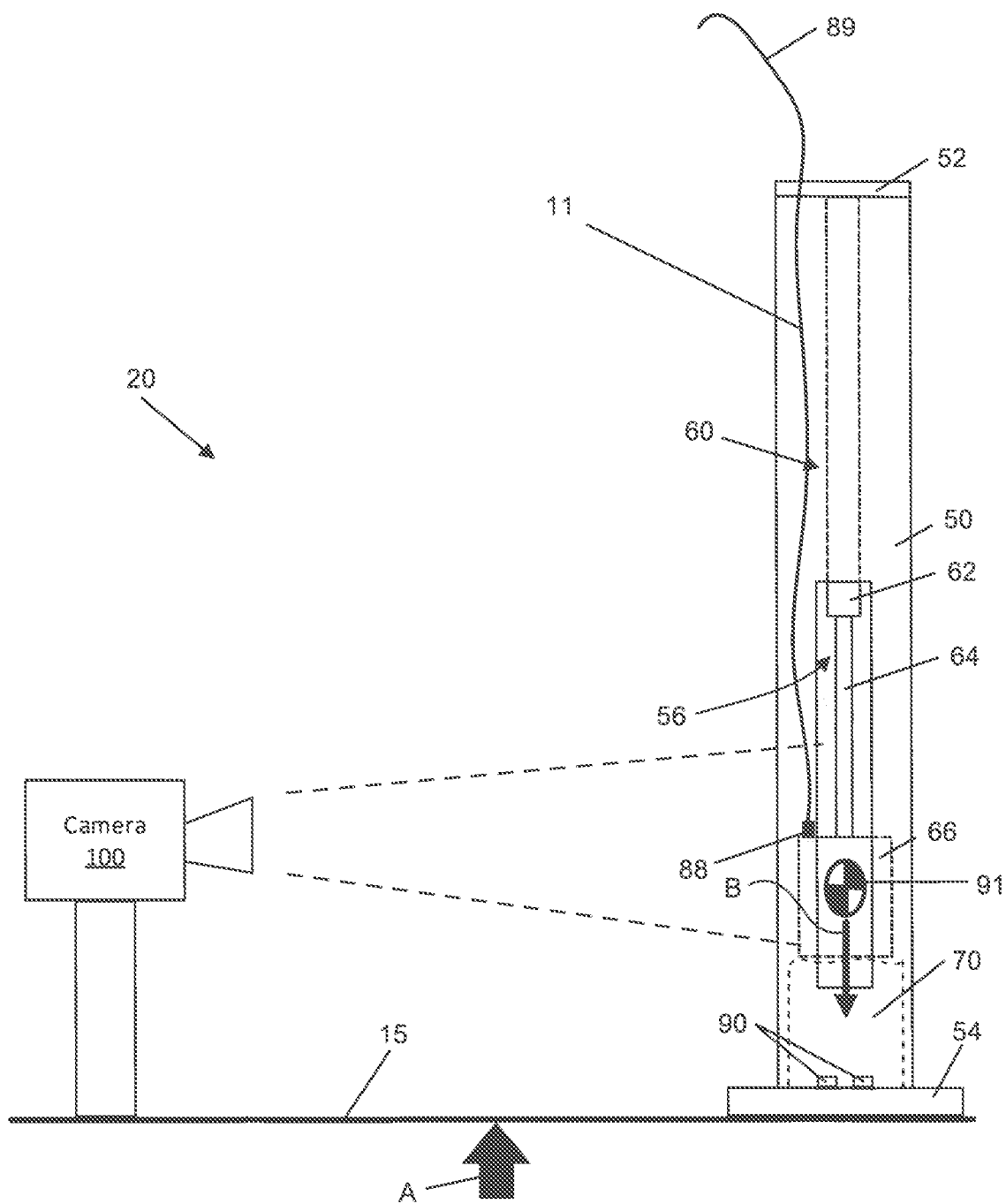
FIG. 4 illustrates an example view of the system/test environment in operation to test a hull of a vehicle in response to an underbody blast event.

Having described the components of the shock gauge system 20, its use and operation are now described with reference to FIG. 4. Before a test explosion is detonated, the camera begins to image the mass 66 and the top of the crush block 70 through the opening 56 in the housing 50 and continues to take images until the testing is completed. Upon the testing beginning with the detonation of an upward explosion beneath the floor 15 of the vehicle hull under test, an large upward pulse of force as indicated by arrow A is created. This force lifts the vehicle hull and floor 15 so that a downward force is created, at the time of the explosion, as indicated by arrow B and the acceleration of the electronic accelerometers 90 is captured and recorded. As illustrated, this downward force (arrow B) generally originates in the mass 66 and is exerted onto the crush block 70. This rapid downward force causes the mass 66 to crush the top of the crush block 70 and this action is captured by the camera 100 and the LDP device 60.

When the upward force represented by arrow A is purely vertical, gravity will eventually overcome this force when the vehicle hull reaches its maximum height and the force represented by arrows A and B are now zero. Gravity now acts on all components of the shock gauge system 20 equally so that there is no force between the mass 66 and the crush block 70. Upon the vehicle hull returning to and hitting the ground, another downward force is created to again force the mass 66 to crush the top of the crush block 70 a bit more and this action is captured by the camera 100 and the LDP device 60. Of course, the electronic accelerometers 90 record their acceleration from before the explosion until after the vehicle hull returns to rest upon the ground.

Upon completion of the test, time stamped images from the camera 100, data from the LDP device 60 and the data from the electronic accelerometers 90 may now all be compared. In some embodiments, the data from the electronic accelerometers 90 is first filtered to remove unwanted noise. For example, for some types of explosions and hull shapes there may be unwanted hull vibrations that may be capture by the sensitive electronic accelerometers 90. These vibrations can be filtered out of the data generated by the electronic accelerometers 90 using high pass filtering techniques so that data more accurately represents the acceleration the vehicle hull experienced. Those of ordinary skill in this art will appreciate that other filtering techniques may be used to remove other types of unwanted noise from the data generated by the electronic accelerometers 90. Next, data from the LDP device 60, crush data of the crush block 70 and the time stamped images of the movement of the mass 66 may all be converted to a standard comparable format and then be used to verify whether the acceleration data from the accelerometers is accurate or not. When the data from the LDP device 60, crush data of the crush block 70 and the time stamped images of the movement of the mass 66 are well-correlated and verify the acceleration data from the accelerometers is accurate, the acceleration data may then be used to design a better blast resistant vehicle hull.

Figure 5:
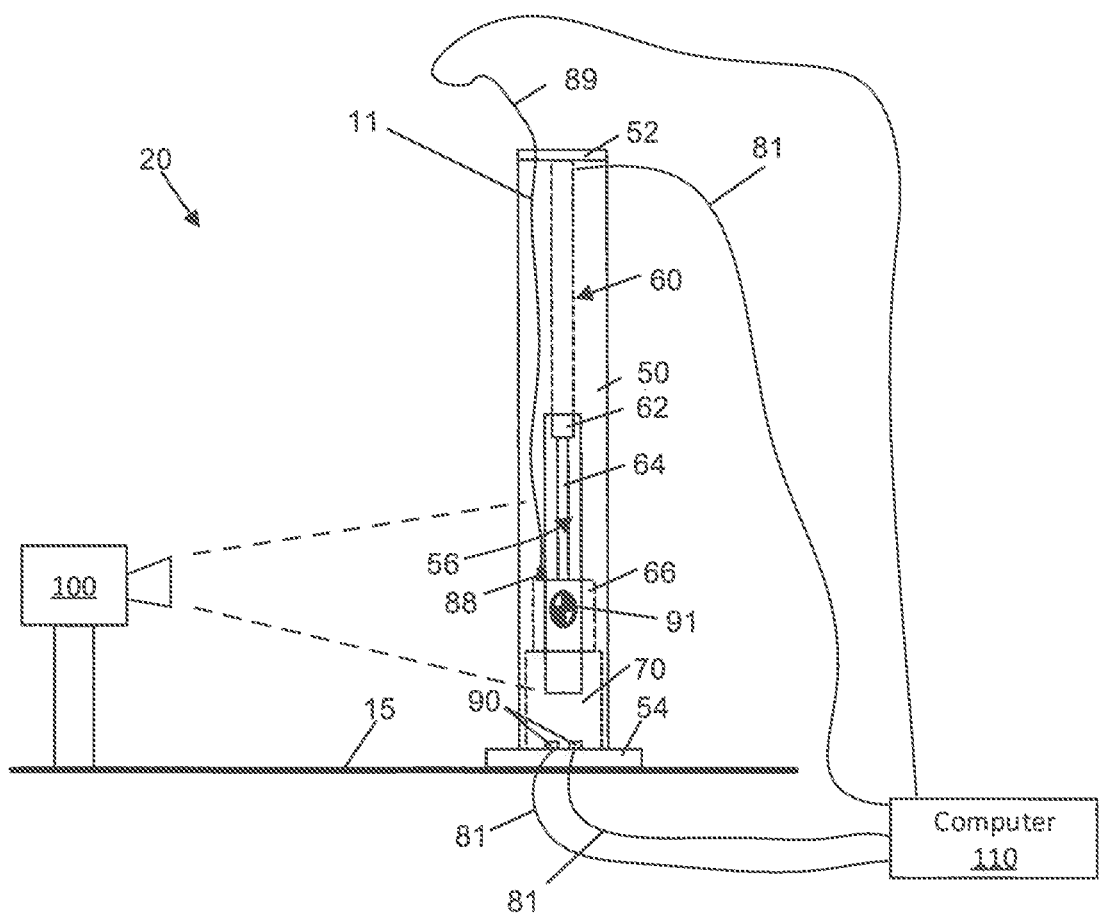
FIG. 5 illustrates another example system/test environment that may be used to test a hull of a vehicle.

FIG. 5 illustrates another embodiment that utilizes a computer 110 (or a processor logic) to calculate correlation and/or other values. Of course, those of ordinary skill in the art will appreciate that the computer 110 need not be a full computer but may be a general processor logic or something lesser than a full computer. "Processor" and "Logic", as used herein, includes but is not limited to hardware, firmware, software and/or combinations of each to perform a function (s) or an action(s), and/or to cause a function or action from another logic, method, and/or system. For example, based on a desired application or needs, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

Preferably the computer 110 is located externally away from the vehicle hull under test so that the computer 110 is not damaged during testing. In some embodiments, the computer 110 (or processor logic) may first receive analog electronic acceleration data and analog LDP data and convert these data streams to digital data streams. The computer 110 may also process sequences of images and perform image processing on images captured by the camera 100 to determine linear displacement and acceleration based on the time stamped images. The computer 110 may also perform digital filtering techniques to filter the data from the electronic accelerometers 90 to remove unwanted noise. High pass filtering techniques may be performed digitally in the computer 110 so that data more accurately representing the acceleration of the vehicle hull is generated. Those of ordinary skill in this art will appreciate that other filtering techniques may be used to remove other types of unwanted noise from the data generated by the electronic accelerometers 90. Next, the digital acceleration data, LDP data, processed image data can be digitally correlated, in the computer 110 (or a processor logic) to determine if the acceleration data is valid. If the correlation value is sufficient strong as compared to prior matching correlation values, then the acceleration data is determined to be valid and this data may be confidently used by engineers to design a vehicle hull to better withstand similar blasts in the future.

In summary, the shock gauge system 20 provides for the three independent measurements/determinations of acceleration (1) by accelerometer, (2) tracking a mass by time-stamped video to determine time-based position; and (3) determining time-based position by a linear potentiometer. Maximum change in distance during the test and measured at (2) and (3) are verified using deformation of a material (honeycomb) having known crush/deformation characteristics. Measurements (2) and (3) are then used to verify the data output by (1) the accelerometer after the accelerometer output is filtered using desirable filtering techniques to eliminate unwanted hull vibrations (e.g., high-pass filtering).

Other possible configurations may assure accuracy of the acceleration data in other ways. One embodiment may utilize multiple accelerometers in the same location on the vehicle structure to collect test data and compare during data analysis. However when there are significant differences in adjacent acceleration data exists, uncertainty exists and techniques must be used to determine which acceleration data set is correct or detect if possibly neither data set is correct.

In another embodiment, a comb gauge is used to measure deflection near the accelerometer(s). However, the comb gauge may be limited to providing total maximum deflection as per the permanent strain of the comb teeth after the blast event is completed. The comb gauge provides only a single time-independent attributes data maximum deflection measurement whereas time dependent data is needed to verify the acceleration data.

Methods that can be implemented in accordance with the disclosed subject matter, may be at least partially implemented with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that in some embodiments the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
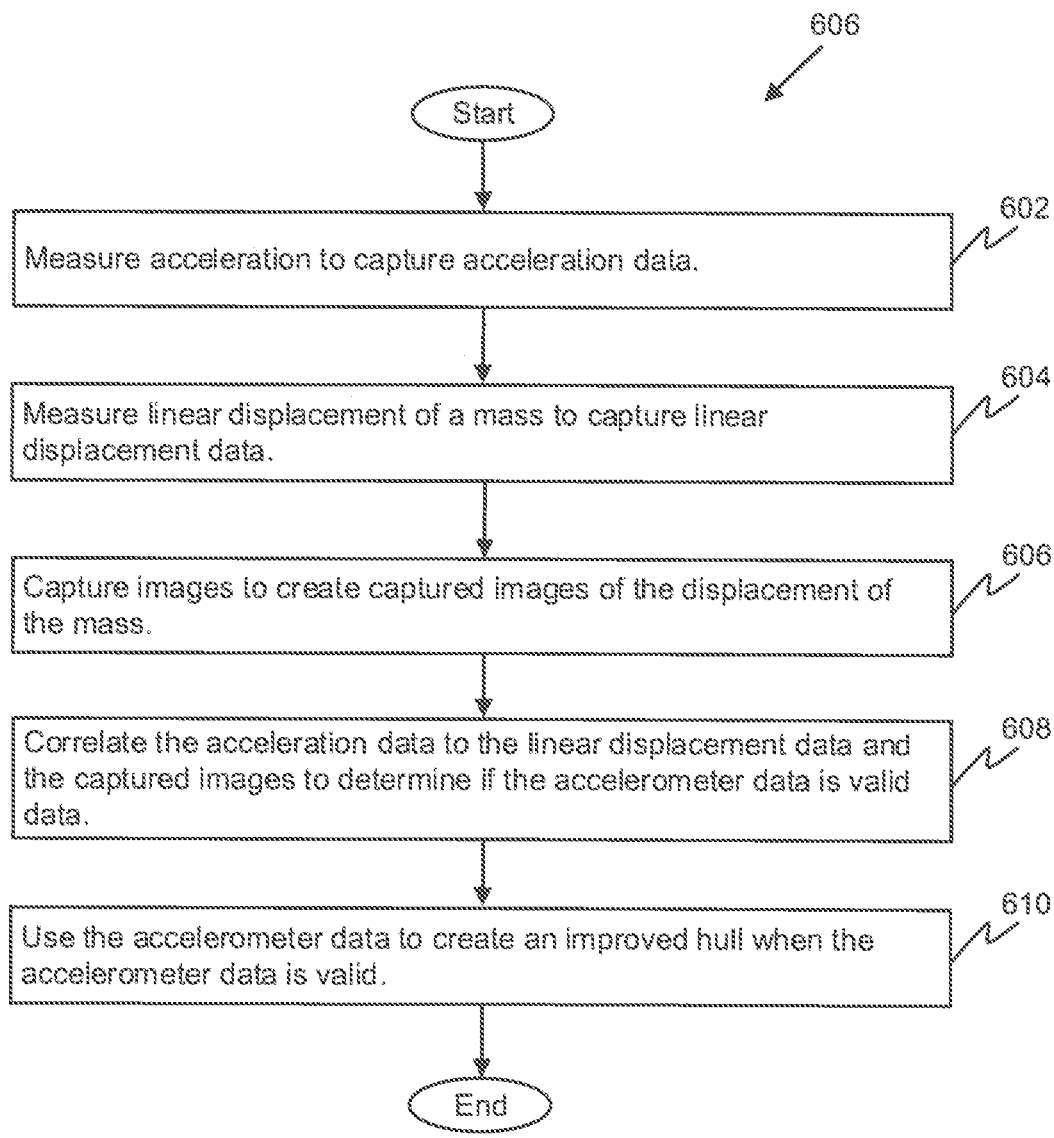
FIG. 6 illustrates an example method of analyzing an external blast to a hull.

Thus, various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments FIG. 6 illustrates some example actions of a method 600 of analyzing an external blast to a hull. The method begins, at 602, by measuring acceleration to capture acceleration data. The linear displacement of a mass is calculated, at 604, to capture linear displacement data. For example, the mass displacement may be double integrated to find and acceleration of the mass. The method 600, next captures images to create captured images of the mass, at 606. The acceleration data are correlated to the linear displacement data and the captured images to determine, at 608, if the acceleration data is valid data. The acceleration data is used, at 610, to create an improved hull when the acceleration data is valid.

Figure 7:
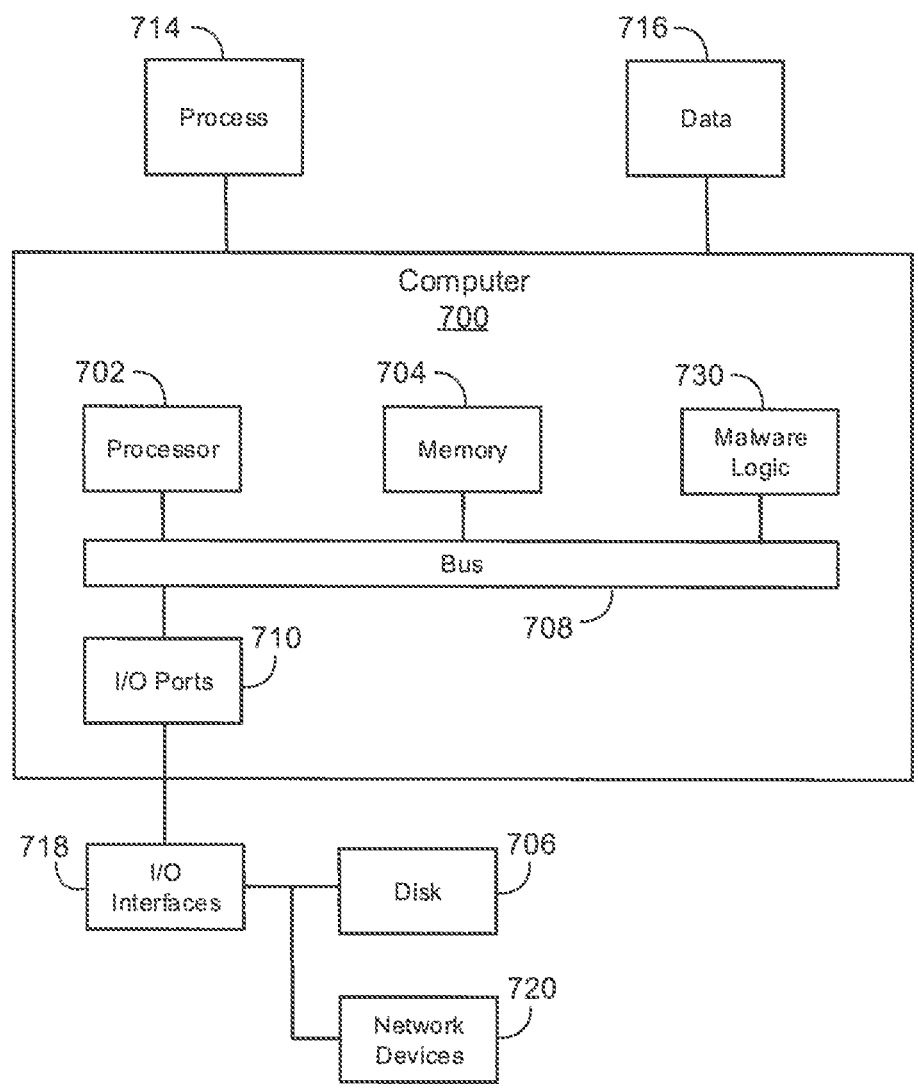
FIG. 7 illustrates an example view of an embodiment of a computer system for correlating acceleration values to displacement values and other data.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include shock gauge data correlation logic 730. In different examples, the shock gauge data correlation logic 730 may be implemented in hardware, software, firmware, and/or combinations thereof. Thus, the shock gauge data correlation logic 730 may provide means (e.g., hardware, software, firmware) for taking data such as LDP data, video image data, crush data and the like and correlating that data to acceleration data to determine if the acceleration data is accurate. While the shock gauge data correlation logic 730 is illustrated as a hardware component attached to the bus 708, it is to be appreciated that in one example, shock gauge data correlation logic 730 could be implemented in the processor 702.

Generally describing an example configuration of the computer 700, the processor 702 may be a variety of various processors including dual microprocessor and other multi-processor architectures. The memory 704 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DRRAM) and the like.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, and/or a memory stick. Furthermore, the disk 706 may be a CD-ROM, a CD recordable drive (CD-R drive), a CD rewriteable drive (CD-RW drive), and/or a digital video ROM drive (DVD ROM). The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other buses (e.g., PCIE, SATA, Infiniband, 11384, USB, Ethernet). The bus 708 can be types including, for example, a memory bus, a memory controller, a peripheral bus, an external bus, a crossbar switch, and/or a local bus.

The computer 700 may interact with the input/output devices via the input/output interfaces 718 and the input/output ports 710. The input/output devices may be, for example, a keyboard, a microphone, a pointing and selection device, cameras, video cards, displays, the disk 706, the network devices 720, and so on. The input/output ports 710 may include, for example, serial ports, parallel ports, USB ports and the like.

The computer 700 can operate in a network environment and thus may be connected to the network devices 720 via the input/output interfaces 718, and/or the input/output ports 710. Through network devices 720, computer 700 may interact with a network. Through the network, the computer 700 may be logically connected to remote computers. Networks with which the computer 700 may interact include, but are not limited to, a local area network (LAN), a wide area network (WAN), and other networks. The networks may be wired and/or wireless networks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims. Accordingly, the disclosure is intended to embrace all such alterations, modifications, and variations that fall within the scope of this application, including the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Additionally, references to "the preferred embodiment", "an embodiment", "one example", "an example" and the like, are not to be construed as preferred or advantageous over other embodiments or designs. Rather, use of the words "the preferred embodiment", "an embodiment", "one example", "an example" and the like are intended to present concepts in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A shock gauge system to test a reaction of a vehicle hull to an external blast comprising:
    a high speed camera;
    a shock gauge device comprising:
        a housing, wherein an inner surface of the housing defines an internal chamber, and wherein the housing further includes an opening defined within a wall of the housing;
        a linear displacement potentiometer (LDP) device positioned within the internal chamber of the housing, wherein the LDP device comprises an LDP cylinder and an LDP rod at least partially slidably located within the LDP cylinder;
        a mass positioned within the internal chamber of the housing and attached to a lower end of the LDP rod, wherein the LDP device is configured to capture linear displacement data of the mass;
    a crush block with known crush characteristics positioned within the internal chamber of the housing, wherein the mass is pushed into the crush block during the test and the camera is adapted to capture images of a movement of the mass with respect to the crush block during the test; and
    at least one accelerometer configured to generate acceleration data during the test, wherein the acceleration data, the linear displacement data, and/or the images captured by the camera are correlated with the acceleration data to determine if the acceleration data is valid, and wherein when the acceleration data is valid the acceleration data is used to develop a vehicle hull to better withstand the external blast.

2. The shock gauge system of claim 1 wherein the at least one accelerometer comprises:
    a mass accelerometer mounted to the mass configured to capture the acceleration data associated with the mass.

3. The shock gauge system of claim 1 further comprising:
    a computer constructed and arranged to receive the acceleration data, the linear displacement data, and/or the images, and wherein the computer further includes a high pass filter constructed and arranged to filter unwanted noise from the acceleration data.

4. The shock gauge system of claim 1 further comprising:
    a threshold correlation value, wherein when at least one of the group consisting of: the linear displacement data and the images captured by the camera are correlated with the acceleration data to produce a correlation value, wherein when the correlation value is above the threshold correlation value the acceleration data is valid, and wherein when the correlation value is below the threshold correlation value the acceleration data is not valid.

5. The shock gauge system of claim 4 wherein the acceleration data is converted to digital acceleration data and the linear displacement data is converted to digital linear displacement data, and wherein the digital acceleration data, the digital linear displacement data and the images are digitally correlated to determine the correlation value.

6. The shock gauge system of claim 1 wherein when at least one of the group consisting of: the acceleration data and the linear displacement data is a voltage value over time.

7. The shock gauge system of claim 1 wherein the images further comprise:
time-stamped images.

8. The shock gauge system of claim 1 wherein the mass is rectangular in shape.

9. The shock gauge system of claim 1 wherein the opening is an elongated opening allowing the camera to capture images of the mass and a top portion of the crush block.

10. The shock gauge system of claim 1 further comprising:
a stabilizing spring coiled around the LDP rod to protect an LDP measuring mechanism of the LDP device during return-to-earth dynamics to include rebound effects.

11. A shock gauge system for measuring an external blast to a hull comprising:
at least one accelerometer to produce acceleration data in response to the external blast;
a crush block;
a linear displacement potentiometer (LDP) device to generate displacement data of a mass being pushed into the crush block when reacting to the external blast;
a housing with an opening, and wherein the crush block and the LDP device are located within an internal chamber of the housing;
a camera to capture images of movement of the mass through the opening in the housing; and
a processor logic to verify if the acceleration data is valid by correlating the acceleration data to at least one of the group consisting of: the displacement data, the images of the movement of the mass, and an amount of displacement into the crush block by the mass, and wherein when the acceleration data is valid, marking the acceleration data as usable to create a more blast resistant hull.

12. The shock gauge system for measuring an external blast to a hull of claim 11 further comprising:
a filter configured to filter unwanted hull resonant frequencies from the acceleration data.

13. The shock gauge system for measuring an external blast to a hull of claim 11 wherein the housing comprises a first side wall, a second side wall, a third side wall, a fourth side wall, and a top wall attached to the first side wall, the second side wall, the third side wall, and the fourth side wall, wherein an inside surface of each of first side wall, the second side wall, the third side wall, the fourth side wall, and the top wall define the internal chamber, and wherein the opening is defined within one of the first side wall, the second side wall, the third side wall, or the fourth side wall of the housing, and wherein the camera captures images of a top of the crush block and at least a portion of the mass through the opening.

14. The shock gauge system for measuring an external blast to a hull of claim 11 wherein the crush block further comprises:
vertical open tubes that have hexagonal cross-sections.

15. A method of analyzing an external blast to a hull comprising:
attaching a shock gauge device to a floor of a hull, wherein the shock gauge device comprises a housing, a linear displacement potentiometer (LDP) device positioned within the housing, wherein the LDP device includes an LDP cylinder and an LDP rod at least partially slidably located within the LDP cylinder; a mass attached to a lower end of the LDP rod and positioned within the housing; and at least one accelerometer attached to the shock gauge device;
attaching a camera to the floor of the hull;
detonating an explosive device positioned underneath the hull causing an external blast measuring acceleration with the at least one accelerometer to capture acceleration data;
measuring linear displacement of the mass with the LDP device to capture linear displacement data;
capturing images of the mass with the camera to create captured images of the displacement of the mass;
correlating the acceleration data to at least one of the linear displacement data and the captured images to determine if the acceleration data is valid data; and
using the acceleration data to create an improved hull when the acceleration data is valid.

16. The method of analyzing an external blast to a hull of claim 15 further comprising:
filtering the acceleration data to remove unwanted hull vibration frequencies created by the external blast.

17. The method of analyzing an external blast to a hull of claim 16 wherein the filtering further comprises:
filtering the acceleration data with a high pass filter.

18. The method of analyzing an external blast to a hull of claim 17 further comprising:
converting the acceleration data to digital acceleration data, converting the linear displacement data to digital linear displacement data and performing the correlating using the digital acceleration data and the digital linear displacement data.

19. The method of analyzing an external blast to a hull of claim 18 further comprising:
performing the correlating using a computer.

20. The shock gauge system of claim 1, wherein the shock gauge device is constructed and arranged to attach to a floor of a vehicle hull.

* * * * *